United States Patent Office 3,579,513
Patented May 18, 1971

3,579,513
1-(1-SUBSTITUTED-4-ACETONYL-4-PIPERIDYL)-1-BUTANONES
Hans Herbert Kühnis, Basel, and Ulrich Renner, Riehen, near Basel, Switzerland, assignors to Geigy Chemical Corporation, Ardsley, N.Y.
No Drawing. Filed Dec. 30, 1968, Ser. No. 788,070
Claims priority, application Switzerland, Jan. 11, 1968, 424/68
Int. Cl. C07d 29/20
U.S. Cl. 260—240     3 Claims

ABSTRACT OF THE DISCLOSURE 4-acetonyl-4-alkanoyl-piperdine derivatives, substituted in 1-position by lower alkyl to which is attached either directly or by way of a vinylene, an oxygen, a carbonyl, a hydroxymethylene, an imino, an alkanoyloxymethylene, an alkylimino, an alkenylimino or an alkanoylimino group, a substituted or unsubstituted phenyl moiety, have analgesic and antitussive properties; pharmaceutical compositions comprising these compounds and methods for alleviating pain and producing an antitussive effect are provided; an illustrative embodiment is 1-[1-(3-phenylpropyl)-4-acetonyl-4-piperidyl]-1-butanone.

FIELD OF THE INVENTION

This invention relates to novel 4-acetonyl-4-alkanoyl-piperidine derivatives which have analgesic and antitussive properties, to pharmaceutical compositions, and to the treatment of pain and tussive irritation with same.

SUMMARY OF INVENTION

The present invention relates to compounds of the Formula I

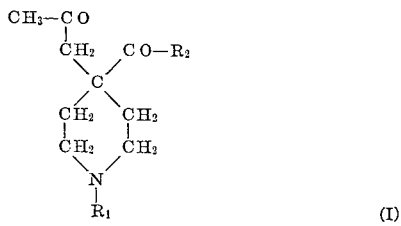

(I)

wherein $R_1$ is cinnamyl or phenyl-loweralkyl wherein the phenyl moiety is unsubstituted or substituted by halogen up to the atomic number 35 or by lower alkoxy, whereby such substituted or unsubstituted phenyl-loweralkyl does not contain more than 12 carbon atoms, and wherein the phenyl moiety instead of being bound directly to the lower alkyl moiety can also be bound thereto by way of oxygen, a carbonyl, a hydroxymethylene, an imino, an alkanoyloxymethylene, an alkylimino, an alkenylimino or an alkanoylimino group, and $R_2$ is alkyl containing from 2 to 4 carbon atoms, and to pharmaceutically acceptable acid addition salts thereof.

This invention also includes pharmaceutical compositions which comprise a compound defined hereinabove, together with a suitable pharmaceutical carrier, and to methods of alleviating pain and producing an antitussive effect with above-defined compound.

DETAILED DESCRIPTION OF THE INVENTION

In the compound of Formula I and in the relevant starting materials mentioned below, $R_1$ denotes, e.g. the cinnamyl group, the p-fluorobenzyl, o-, m- or p-chlorobenzyl, p-bromobenzyl, 3,4-dichlorobenzyl, p-methoxybenzyl, p-ethoxybenzyl, p-isopropoxybenzyl, 3,4-dimethoxybenzyl or 3,4,5-trimethoxybenzyl, or the 2-phenylethyl, 3-phenylpropyl, 4-phenylbutyl, 2-phenoxyethyl, 3-phenoxypropyl, 4-phenoxybutyl, phenacyl, 2-benzoylethyl, 3-benzoylpropyl, 2-hydroxy-2-phenyl-ethyl, 3-hydroxy-3-phenylpropyl, 4-hydroxy-4-phenylbutyl, 2-acetoxy-2-phenylethyl, 2-propionoxy-2-phenylethyl, 3-acetoxy-4-phenylbutyl group, the phenyl nucleus of which can also be substituted to the aforementioned benzyl groups; ethyl and n-propyl groups which are substituted in their ω-position by the anilino, o-toluidino, m-toluidino, p-toluidino, 3,4-xylidino, 2,6-xylidino, mesidino, p-ethylanilino, p-isopropyl-anilino, m-fluoroanilino, p - fluoroanilino, o - chloroanilino, m-chloroanilino, p-chloroanilino, p-bromoanilino, o-anisidino, m-anisidino, p-anisidino, o-phenetidino, m-phenetidino, p-phenetidino, p-propoxy-anilino, N-methyl-anilino-, N-n-propyl-anilino, N-allyl-anilino, N-phenyl-acetamido, (N - o - tolyl-acetamido)-, (N-m-tolyl-acetamido)-, (N-p-tolyl-acetamido)-, (N-m-fluorophenyl-acetamido)-, (N-p-fluorophenyl - acetamido) -, (N-o-chlorophenyl-acetamido)-, (N-m-chlorophenyl-acetamido)-, (N-p-chlorophenyl-acetamido)-, (N-3,4-dichlorophenyl-acetamido)-, (N-p-bromophenyl-acetamido)-, (N-m-methoxyphenyl-acetamido)-, or (N-p-methoxyphenyl-acetamido).

A preferred subclass, on account of good analgesic and antitussive activity, are the compounds of Formula I, wherein $R_1$ is cinnamyl, phenyl-loweralkyl, or phenyl-loweralkyl wherein phenyl is bound to the loweralkyl by way of hydroxymethylene, alkanoyloxymethylene, imino or loweralkanoylimino, and $R_2$ is propyl, and the pharmaceutically acceptable acid addition salts thereof Preferred members of this subclass are on account of good analgesic activity the following compounds:

1-[1-(2-phenylethyl)-4-acetonyl-4-piperidyl]-1-butanone,
1-[1-(3-phenylpropyl)-4-acetonyl-4-piperidyl]-1-butanone,
1-(1-cinnamyl-4-acetonyl-4-piperidyl)-1-butanone,
1-[1-(3-hydroxy-3-phenylpropyl)-4-acetonyl-4-piperidyl]-1-butanone,
1-[1-(3-propionoxy-3-phenylpropyl)-4-acetonyl-4-piperidyl]-1-butanone,
1-[1-(2-anilinoethyl)-4-acetonyl-4-piperidyl]-1-butanone, and in particular, the acid addition salts thereof with fumaric acid.

Another preferred member of the above-mentioned subclass is, on account of its antitussive activity, 1-{1-[2-(N-phenylpropionamido) - ethyl] - 4 - acetonyl-4-piperidyl}-1-butanone and, in particular, the addition salt thereof with fumaric acid.

To produce the new piperidine derivatives of the Formula I and their addition salts, a compound of the Formula II

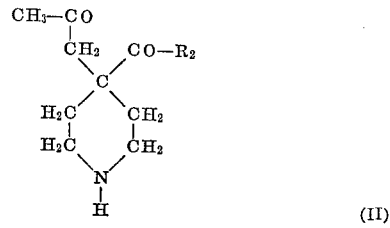

(II)

wherein $R_2$ has the meaning given under Formula I is reacted with a reactive ester of a compound of the Formula III $R_1$—OH     (III)

wherein $R_1$ has the meaning given under Formula I, and optionally the obtained compound of the Formula I is converted into an addition salt with an inorganic or organic acid. The reaction is carried out at room temperature or at a moderately increased temperature in a suitable organic solvent, such as e.g. ethanol, acetone, diethyl ketone or dimethyl formamide. Optionally, the reaction is accelerated by the addition of acid-binding agents, such as e.g. potassium carbonate, and/or catalysts, such as e.g. potassium iodide. Suitable reactive esters of compounds of the Formula III are, in particular, hydrohalic acid esters, such as bromides, chlorides and iodides, also arene sulfonic acid esters, e.g. p-toluene sulfonic acid esters. The starting materials of the Formula II are, for their part, new compounds, the production of which is explained below.

According to a second process, compounds of the Formula I and their acid addition salts are produced by treating a compound of the Formula IV

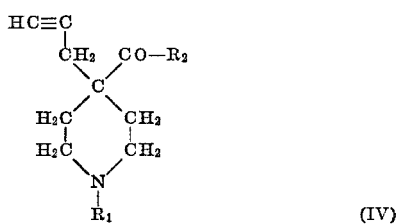

wherein $R_1$ and $R_2$ have the meanings given under Formula I, with an aqueous mineral acid containing mercury ions at room temperature up to a moderately increased temperature, and optionally converting the obtained compound of the Formula I into an addition salt with an inorganic or organic acid. A suitable aqueous mineral acid is, for example, 2–84% sulfuric acid. The reaction temperature is kept lower with increasing acid concentration; using 84% sulfuric acid the reaction is preferably performed at room temperature, and at 50–80° using 2–10% sulfuric acid.

The starting materials of the Formulas II and IV, for the first or second process, can for example be produced as follows: by reacting isonipecotamide with a reactive ester of a compound of the Formula III, with exception of compounds having a carbonyl or alkanoyloxy group analgously to the first mentioned process for the production of compounds of the Formula I, and then by splitting off of water, e.g. by boiling with thionyl chloride in benzene or in chloroform, or by heating with phosphorus pentoxide, isonipecotonitriles, substituted in 1-position by a group $R_1$ of corresponding narrower meaning, are obtained. Analogously, correspondingly substituted lower isonipecotic acid alkyl esters can be obtained by reacting lower isonipecotic acid alkyl esters with reactive esters of compounds of Formula III, with corresponding narrower meaning of $R_1$. A further production process is the quaternisation of lower isonipecotic acid alkyl esters with reactive esters of compounds of Formula III, and subsequent catalytic hydrogenation, e.g. in the presence of rhodium/aluminum oxide/catalysts. The 1-substituted nitriles and esters of isonipecotic acid are converted into their alkali metal derivatives and the latter reacted with lower 2-propinyl-halides, e.g. the bromide or iodide to give the 1-substituted 4-(2-propinyl)-isonipecotic nitriles or the 4-(2-propinyl)-isonipecotic acid esters. Suitable as the reaction medium for these condensations is, for example, a mixture of absolute diethyl ether or tetrahydrofuran with 1,2-dimethoxyethane (ethylene glycol dimethylether). The required alkali metal compounds of 1-substituted isonipecotonitriles and isonipecotic acid alkyl esters are produced in situ from other suitable alkali metal compounds. Triphenylmethyllithium, which as such a compound is particularly suitable, is preferably formed likewise in situ from another organic lithium compound, such as phenyl lithium, by adding for example, a solution of triphenyl methane in 1,2-dimethoxyethane to the phenyl lithium produced in the known manner, which is present in diethyl ether. Since the triphenylmethyl lithium produces intensively colored solutions, its formation and also its consumption by the subsequently added 1-substituted isonipecotonitrile or the 1-substituted isonipecotic acid ester can be easily followed. Instead of triphenylmethyl lithium, it is also possible to use for example, triphenylmethyl sodium or -potassium. The aforementioned stages of the process are for the most part slightly exothermic and can be carried out at room temperature or at slightly elevated temperature. It must also be possible, depending on the starting materials and amounts thereof used, for the reaction mixture, if necessary, to be cooled.

The 1 - substituted 4 - (2 - propinyl) - isonipectonitriles or 4 - (2 - propinyl) - isonipecotic acid alkyl esters obtained in the case of the above-described condensation, are subsequently reacted according to Grignard with alkylmagnesium halides, the alkyl group of which contains 2–4 carbon atoms, to give compounds of the Formula IV, whereby the amount of alkyl-magnesium halide is correspondingly increased if a hydroxy- or imino group is present in $R_1$.

To obtain starting materials of the Formula II, lower isonipecotic acid alkyl esters or isonipecotamide are, for example, firstly reacted with chloroformic acid benzyl esters instead of with reactive esters of compounds of the Formula III. The thus obtained 1-benzyloxy-carbonyl isonipecotic acid esters or the 1 - carbobenzyloxy - isonipecotonitrile obtained from the amide after subsequent splitting of water, are converted analogously to the above-stated reaction sequence, into their alkali metal derivaties and the latter condensed with 2-propinyl halides. The obtained 4 - (2 - propinyl) - 1 - benzyloxycarbonyl isonipecotic acid esters or -isonipecotonitriles are reacted either directly with alkyl-magnesium halides according to Grignard to give 1 - ( 1 - benzyloxycarbonyl - 4 - (2 - propinyl) - 4 - pyridil) - 1 - alkanones, the latter then hydrated analogously to the second stated process for the production of compounds of the Formula I and the 1-benzyloxycarbonyl group is split off, either in the same operation or subsequently, for example by treatment with hydrobromic acid in glacial acetic acid and/or boiling with dilute hydrochloric acid. According to another variation, the benzyloxycarbonyl group is split off before the Grignard reaction by treatment with hydrobromic acid in glacial acetic acid at room temperature. The double molar amount of alkylmagnesium halide is then used in the subsequent Grignard reaction and finally hydration of the 2-propinyl group in 4-position is carried out.

Optionally, the piperidine derivatives of the Formula I obtained using the process according to the invention, are subsequently converted in the usual manner into their addition salts with inorganic and organic acids. For example, a solution of a piperidine.derivative of the Formula I in an organic solvent, such as diethyl ether, methanol or ethanol, is mixed with the acid, desired as the salt component, or with a solution thereof, and the salt which precipitates direct, or after the addition of a second organic liquid, such as e.g. diethylether to methanol, is isolated.

For use as active substances for medicaments, pharmaceutically acceptable acid addition salts can be used instead of free bases, i.e. salts with those acids the anions of which, in the case of the dosages in question, have either no pharmacological action or which, in themselves, have a desired pharmacological action. Furthermore, it is of advantage if the salts to be used as active substances, crystallise well and are not, or only slightly hygroscopic. Hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, succinic acid, fumaric acid, maleic acid, benzoic acid, salicylic acid, phenylacetic acid, mandalic acid, embonic acid, cyclohexylamine sulphuric acid or 1,5-naphthalene disulphonic acid, for example, can be used.

UTILITY

The compounds of the present invention are useful as analgesic and antitussive agents as is shown by their ability to prevent pain reactions in mice, the tails of which are exposed to heat radiation, and to prevent coughing in cats, the Nervus laryngeus superior of which is electrically stimulated, and in guinea pigs exposed to irritating sulfurdioxide-carbondioxide-air mixtures.

As an example of the use of the compounds of the invention, the use of 1 - [1 - (3 - propionoxy - 3 - phenylpropyl) - 4 - acetonyl - 4 - piperidyl] 1 - butanone fumarate as an alagesic is described. The test method is that described by F. Gross, Helv. Physiol. Acta 5, C31 (1947), whereby the apparatus of Friebel and C. Reichle, Arch. exp. Path. und Pharmakol. 226, 551 (1955), is used.

The apparatus comprises an electrically heated lamp which is placed in the focus of a semi-elliptical metal concave mirror. Under the mirror, on a turn-table, there are located 10 small plexiglass cages, each holding a white mouse in such a position that the mouse-tail rests stretched out in a small groove on a plexiglass plate. The turn-table can be turned so that the mouse-tails one after the other come to be placed into the second focus of the elliptical mirror. Pain is induced by the convergent heat radiation from the mirror and the time is measured from the moment when the heat reaches the mouse-tail till the moment at which the mouse twitches its tail.

Two series of 10 mice each are tested prior to the administration of the test compound and the normal reaction time for each mouse is recorded. 1 - [1 - (3 - propionoxy - 3 - phenylpropyl) - 4 - acetonyl - 4 - piperidyl]-1-butanone fumarate is intraperitoneally administered in the form of a 0.5% aqueous solution in amounts of around 1 mg./kg. The reaction times after the injection are recorded, thus enabling determination of the intensity and the duration of the analgensic effect of the test compound administered.

A significant increase of the threshold of irritation, i.e. a prolongation of reaction time, is obtained.

A similar prolongation of reaction time is obtained if the fumarates of the other preferred members of the compounds of the invention are injected in amounts of about 0.6 to about 15 mg./kg.

The antitussive activity of compounds of the Formula I and their salts, e.g. the fumarate of 1 - [1 - [2 - (N - propionamido) - ethyl] - 4 - acetonyl - 4 - piperidyl]-1-butanone, is shown, for example, in the case of intravenous administration to cats using the method of R. Domenjoz, Arch. exp. Path. and Pharmakol. 215, 19–24 (1952).

Healthy cats of normal weight are narcotized by intraperitoneal injection of 30–65 mg./kg. of aprobarbital so that a relatively superficial narcosis is obtained. About 45 minutes after the injection of the narcotic, the preparation of the Nervus laryngeus superior is started by fitting on an irritation-electrode. An apparatus manufactured by "Grass Medical Instruments," Type SD5, allowing irritation of the aforesaid nerve with rectangular current-impulses of any desired frequency and intensity is connected to the electrode. The irritation-frequency applied is 5 cycles at an irritation-intensity between 0.5 and 3 volts.

The irritation-duration is about 8 seconds and the interval between two irritations is about 120 seconds. For the registrations of the cough reflexes, a Marey capsule is used. A respiration-cannula is introduced through the oral cavity down to the glottic chink. The hydrochloride of 1-(3-phenylpropyl)-4-allyl-isonipecotic acid morpholide is injected intravenously in form of an 0.5% aqueous solution just before the irritation starts. Cough reflexes are inhibited with about 0.5 to 1 mg./kg. of the active compound.

Similar results are obtained with other compounds of the invention, particularly with the preferred members of the subclass.

A further method of showing the antitussive activity is to determine the manner in which tussive irritation in guinea pigs caused by sulphur dioxide is stopped as a result of subcutaneous or oral administration of the test substances: In a preliminary experiment for selecting animals for testing, male guinea pigs are exposed in a plexiglass chamber to a $SO_2$-$CO_2$-air mixture, flowing through at atmospheric pressure, and with a constant mixture ratio of 20 ml:1.5 liters:10.5 liters per minute, until commencement of coughing or for a maximum of 120 secs. The assessment of the commencement of coughing is made by inspection. The guinea pigs reacting by coughing (ca. ⅔ of all animals) are formed into groups, each containing 6 animals. Ca. 24 hours after the preliminary test, these groups of experimental animals receive the test substance, administered subcutaneously or perorally, in various dosages suitable for ascertaining the $ED_{50}$ in mg./kg. Exposure to the irritant gas occurs in the same manner as in the preliminary test after 30 and after 90 minutes following application of the test substances. Assessment of the commencement of coughing is again made by inspection. From the percentage figures, obtained in the case of various dosages, of animals no longer reacting to $SO_2$, the dosage (=$ED_{50}$) preventing the occurrence of coughing in the case of 50% of the animals is determined by graphical interpolation using the Schleicher and Schüll 298½ probability graph.

The toxicity of the compounds of the invention as demonstrated in mice or intraperitoneal administration is of favorable low order.

The new piperidine derivatives of Formula I and their pharmaceutically acceptable acid addition salts are suitable as active substances for pharmaceutical preparations for the amelioration and elimination of pains of varying origin and of tussive irritation. They can be administered orally, rectally or parenterally.

The new piperidine derivatives of Formula I and their salts are administered perorally, rectally or parenterally. The daily dosages of free bases or of pharmaceutically acceptable salts thereof vary between 0.1 and 10 mg./kg. for adult patients. Suitable dosage units such as dragées, capsules, tablets, suppositories or ampoules, preferably contain 1–100 mg./kg. of a piperidine derivative of the Formula I or of a pharmaceutically acceptable salt thereof.

Dosage units for oral administration preferably contain as active substance between 1% and 90% of a piperidine derivative of the Formula I or of a pharmaceutically acceptable salt thereof. They are produced by combining the active substance with, e.g., solid pulverulent carriers, such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance. Other suitable dosage units for oral administration are hard gelatine capsules and also soft, closed capsules made of gelatine and a softener such as glycerin. The former preferably contain the active substance as a granulate in admixture with lubricants such as talcum or magnesium stearate, and optionally stabilisers such as sodium metabisulphite or ascorbic acid. In soft capsules, the active substance is preferably dissolved or suspended in suitable liquids such as liquid polyethylene glycols to which stabilisers can also be added.

Also, particularly for the treatment of coughs, e.g. lozenges as well as forms not made up into single dosages can be used for oral administration, e.g. cough syrups or drops prepared with the usual auxiliaries.

Suitable dosage units for rectal administration are, e.g. suppositories which consist of a combination of a piperidine derivative of the Formula I or a suitable salt thereof with a neutral fatty foundation, or also gelatine rectal capsules containing a combination of the active substance with polyethylene glycols.

Ampoules for parenteral, particularly intramuscular, also intravenous, administration preferably contain a water soluble salt of a piperidine derivative of the Formula I as active substance in a concentration of, preferably, 0.5–5%, optionally together with suitable stabilisers, in aqueous solution.

The following prescriptions further illustrate the production of forms for administration according to the invention:

(a) 5 g. of active substance, e.g. 1-[1-(3-phenylpropyl)-4-acetonyl-4-piperidyl]-1-butanone fumarate, 30 g. of lactose and 5 g. of highly dispersed silicic acid are mixed. The mixture is moistened with a solution of 5 g. of gelatine and 7.5 g. of glycerine in distilled water and is then granulated through a sieve. The granulate is dried, sieved and carefully mixed with 3.5 g. of potato starch, 3.5 g. of talcum and 0.5 g. of magnesium stearate. The mixture is used to press out 1000 tablets each weighing 60 mg. and each containing 5 mg. of active substance.

(b) 5 g. of active substance, e.g. 1-[1-(2-anilinoethyl)-4-acetonyl-4-piperidyl]-1-butanone fumarate, 15 g. of lactose and 20 g. of starch are mixed. The mixture is moistened with a solution of 5 g. of gelatine and 7.5 g. of glycerin in distilled water and is then granulated through a sieve. The granulate is dried, sieved and carefully mixed with 3.5 g. of talcum and 0.5 g. of magnesium stearate. The mixture is used to press out 1,000 dragée cores. These are subsequently coated with a concentrated syrup made from 26.66 g. of crystallised saccharose, 17.5 g. of talcum, 1 g. of shellac, 3.75 g. of gum arabic, 1 g. of highly dispersed silicic acid and 0.090 g. of dyestuff, and dried. The obtained dragées each weigh 110 mg. and each contain 5 mg. of active substance.

(c) To produce 1,000 capsules each containing 5 mg. of active substance, 5 g. of 1-[1-(2-phenylethyl)-4-acetonyl-4-piperidyl]-1-butanone fumarate are mixed with 268 g. of lactose. The mixture is evenly moistened with an aqueous solution of 2 g. of gelatine and is granulated through a suitable sieve (i.e. Sieve III, pH. Helv. V). The granulate is mixed with 10 g. of dried maize starch and 15 g. of talcum and is then evenly filled into 1000 hard gelatine capsules, size 1.

(d) A suppository mixture is prepared from 1.0 g. of 1-[1-minnamyl-4-acetonyl-4-piperidyl]-1-butanone fumarate and 167.5 g. of adeps solidus and the mixture used to fill 100 suppositories each containing 10 mg. of active substance.

(e) 500 mg. of 1-[1-(3-hydroxy-3-phenylpropyl)-4-acetonyl-4-piperidyl]-1-butanone fumarate and 2.2 g. of glycerin are dissolved in distilled water made up to 100 ml. The solution is used to fill 100 ampoules each of 1 ml. and each containing 5 mg. of active substance.

The following examples illustrate the production of the new compounds of the general Formula I but they in no way limit the scope of the invention. The temperatures are given in degrees centigrade.

EXAMPLE 1

4 g. of 1-[1-(3-phenylpropyl-4-(2-propinyl)-4-piperidyl]-1-butanone with 0.4 g. of mercury-II sulphate are heated to 60–70° for 3 hours in 40 ml. of 2 N sulphuric acid. The reaction mixture is then made alkaline with concentrated ammonia and extracted with chloroform. The chloroform solution is washed with saturated sodium chloride solution, dried and concentrated by evaporation and the residue distilled under high vacuum. The 1-[(3-phenylpropyl)-4-acetonyl-4-piperidyl]-1-butanone boils at 180–190°/0.02 torr. The fumarate, M.P. 154–156°, is produced by dissolving the base in ether and adding ca. 95% of the theoretical amount of fumaric acid.

The 1-[1-(3-phenylpropyl)-4-(2-propinyl)-4-piperidyl]-1-butanone required as starting material is produced as follows:

(a) 20 g. of isonicotic acid ethyl ester are refluxed with 75.5 g. of 3-phenylpropyl bromide in 100 ml. of ethanol for 5 hours. The ethanol is then evaporated off in vacuo, the residue dissolved in water and the aqueous solution extracted three times with ether. The ethyl ester of the 4-carboxyl - 1 - (3-phenylpropyl)-pyridinium-bromide remains behind after concentration of the aqueous solution in vacuo and finally under high vacuum.

(b) 24.1 g. of the above quaternary salt are hydrogenated in the presence of rhodium/aluminum oxide catalyst (5% Rh) in 200 ml. of ethanol at room temperature and 3–4 atm. pressure. The catalyst is then filtered off and the filtrate concentrated by evaporation. The residue is covered with chloroform and made alkaline with concentrated sodium hydroxide solution. The chloroform is separated and the aqueous phase exhaustively extracted with chloroform. The combined chloroform solutions are washed with saturated sodium chloride solution, dried and concentrated and the residue distilled under high vacuum. The 1-(3-phenylpropyl)-isonipecotic acid ethyl ester boils at 130–132°/0.08 torr.

(c) 0.98 g. of lithium wire cut into small pieces and washed with petroleum ether are added in a 350 ml. four-necked flask, while stirring and under nitrogen, to 11.0 g. of bromobenzene in 100 ml. of absolute ether, whereby the ether commences to boil. After the reaction has subsided, the mixture is refluxed for another 2½ hours. 17.1 g. of triphenylmethane in 80 ml. of absolute 1,2-dimethoxyethane are added all at once at 30° to the obtained solution of phenyl lithium, whereby the solution, due to the formation of triphenylmethyl lithium, becomes deep red in colour and gently boils. After stirring for 20 minutes at room temperature, 18.3 g. of 1-(3-phenylpropyl)-isonipecotic acid ethyl ester in 20 ml. of absolute ether are added at 28°. The deep red solution loses its colour, accompanied by a slight increase in temperature. The solution is stirred for 10 minutes at room temperature and then mixed all at once with 8.0 g. of propargyl bromide (3-bromopropine) in 20 ml. of absolute ether. The mixture is stirred at room temperature for 2½ hours, whereby it assumes a yellowish colour and lithium bromide precipitates. The reaction mixture is then decomposed with 10 ml. of water and concentrated in the rotary evaporator. Ether is added to the residue and the obtained ether solution extracted four times with dilute hydrochloric acid. The acid extracts are rendered alkaline and exhaustively extracted with chloroform. The chloroform extracts are dried and concentrated. The residue is taken up in ether, the ether solution dried and concentrated and the residue is distilled. The 1-(3-phenylpropyl)-4-(2-propinyl)-isonipecotic acid ethyl ester boils at 170–172°/0.05 torr. Fumarate=M.P. 153° (from isopropanol).

(d) The Grignard-compound is produced in the usual manner, in a 250 ml. four-necked flask, from 3.48 g. of magnesium and 17.6 g. of propyl bromide in 50 ml. of ether. 13.6 g. of 1-(3-phenylpropyl)-4-(2-propinyl)-isonipecotic acid ethyl ester in 50 ml. of ether are then added. The reaction is only slightly exothermic. 125 ml. of toluene are then added and the ether distilled off. The solution is then refluxed for 15 hours and then decomposed with water and 2 N hydrochloric acid while cooling with ice. The organic phase is separated off, thoroughly shaken with concentrated ammonia solution and saturated sodium chloride solution, dried and concentrated and the residue distilled under high vacuum. The 1-[1-

(3 - phenylprpoyl)-4-(2-propinyl)-4-piperidyl]-1-butanone boils at 180–187°/0.02 (torr). The fumarate, M.P. 170–171° is produced from this with ethereal hydrogen bromide solution.

EXAMPLE 2

The following are produced analogously to Example 1:

from 1-[1-(3-phenylpropyl)-4-(2-propinyl)-4-piperidyl]-1 - propane the 1 - [1 - (3-phenylpropyl)-4-acetonyl-4-piperidyl]-1-propanone and its fumarate,
and from 1-[1-(3-phenylpropyl)-4-(2-propinyl)-4-piperidyl] - 1 - pentanone the 1-[1-(3-phenylpropyl)-4-acetonyl-4-piperidyl]-1-pentanone and its fumarate.

The required starting materials are produced analogously to Example 1(d) using the corresponding amounts of ethyl bromide or n-butyl bromide in place of the propyl bromide.

EXAMPLE 3

Analogously to Example 1, the following is produced from 1-[1-(2-phenylethyl)-4-(2-propinyl)-4-piperidyl]-1-butanone, 1 - [1-(2-phenylethyl)-4-acetonyl-4-piperidyl]-1-butanone and its fumarate, M.P. 130–133°.

The starting materials are produced completely analogously to the reaction sequence to Examples 1(a) to (d) using 2-phenylethyl bromide in place of 3-phenylpropyl bromide in the case of (a). The 1-(2-phenylethyl)-4-(2-propinyl)-isonipecotic acid ethyl ester, produced analogously to (c), boils at 139–143°/0.08 torr, hydrochloride M.P. 212–213°.

EXAMPLE 4

Analogously to Example 1 are obtained the

1-[1-(2-anilinoethyl)-4-acetonyl-4-piperidyl]-1-butanone, fumarate M.P. 142–143°,
1-[1-(2-benzoylethyl)-4-acetonyl-4-piperidyl]-1-butanone, fumarate M.P. 154–156°,
1-[1-[-(N-phenylpropionamido)-ethyl]-4-acetonyl-4-piperidyl]-1-butanone, fumarate M.P. 128–129°,
1-[1-(3-hydroxy-3-phenylpropyl)-4-acetonyl-4-piperidyl]-1-butanone, fumarate M.P. 142–145°,
1-[(1-cinnamyl)-4-acetonyl-4-piperidyl]-1-butanone, fumarate M.P. 163–165°,
1-[1-(3-propionoxy-3-phenylpropyl)-4-acetonyl-4-piperidyl]-1-butanone, fumarate M.P. 156–157°,
1-[1-(2-phenoxyethyl)-4-acetonyl-4-piperidyl]-1-butanone, M.P. 146°,
1-[1-[3-(p-methoxyphenyl)-propyl]-4-acetonyl-4-piperidyl]-1-butanone, fumarate M.P. 139–140°,
1-[1-[3-(p-fluorobenzoyl)-propyl-4-acetonyl-4-piperidyl]-1-butanone, fumarate M.P. 139–140°,
1-[1-[2-(N-allyanilino)-ethyl]-4-acetonyl-4-piperidyl]-1-butaonone, fumarate M.P. 157–158°

EXAMPLE 5

5 g. of 1-(4-(2-propinyl)-4-piperidyl)-1-butanone are heated with 50 ml. of 2 N hydrochloric acid and 2.5 g. of mercury (II) sulphate for 6 hours at 60–65°. The solution is then decanted from the mercury sulphate and, while cooling, the solution is made alkaline with concentrated ammonia, extracted three times with methylene chloride, dried and evaporated. The 1-(4-acetonyl-4-piperidyl)-1-butanone thereby remains, which is immediately further reacted, 4.2 g. of the above mentioned product are refluxed with 4.5 g. of 3-phenyl-propyl bromide and 6 g. of potash (potassium carbonate) in 60 ml. of diethyl ketone for 20 hours. The potassium carbonate is filtered off by suction, washed with acetone and the filtrate concentrated by evaporation in vacuo. The residue is chromatographed on silica gel in chloroform-methanol 95:5 and the fumarate is produced from the pure product in the usual manner. The 1-(1-(3-phenyl - propyl) - 4-acetonyl-4-piperidyl)-1-butanone fumarate has a M.P. of 154–156°.

The following are produced in a similar manner:

1-[1-(2-phenylethyl)-4-acetonyl-4-piperidyl]-1-butanone fumarate, M.P. 130–133°,
1-[1-(2-anilinoethyl)-4-acetonyl-4-piperidyl]-1-butanone, fumarate M.P. 142–143°,
1-[1-(2-benzoylethyl)-4-acetonyl-4-piperidyl]-1-butanone, fumarate M.P. 154–156°,
1-[1-[-(N-phenylpropionamido)-ethyl]-4-acetonyl-4-piperidyl]-1-butanone, fumarate M.P. 128–129°,
1-[1-(3-hydroxy-3-phenylpropyl)-4-acetonyl-4-piperidyl]-1-butanone, fumarate M.P. 142–145°,
1-[(1-cinnamyl)-4-acetonyl-4-piperidyl]-1-butanone, fumarate M.P. 163–165°,
1-[1-(3-propionoxy-3-phenylpropyl)-4-acetonyl-4-piperidyl]-1-butanone, fumarate M.P. 156–157°,
1-[1-(2-phenoxyethyl)-4-acetonyl-4-piperidyl]-1-butanone, M.P. 146°,
1-[1-[3-(p-methoxyphenyl)-propyl]-4-acetonyl-4-piperidyl]-1-butanone, fumarate M.P. 139–140°,
1-[1-[3-(p-fluorobenzoyl)-propyl-4-acetonyl-4-piperidyl]-1-butanone, fumarate M.P. 139–140°,
1-[1-[2-(N-allylanilino)-ethyl]-4-acetonyl-4-piperidyl]-1-butanone, fumarate M.P. 157–158.

What is claimed is:
1. A compound of the formula:

$$\begin{array}{c} CH_3-CO \\ | \\ CH_2 \quad CO-R_2 \\ \diagdown C \diagup \\ \diagup \quad \diagdown \\ CH_2 \quad CH_2 \\ | \quad\quad | \\ CH_2 \quad CH_2 \\ \diagdown N \diagup \\ | \\ R_1 \end{array}$$

wherein $R_1$ is cinnamyl or 2-phenoxyethyl, and
$R_2$ is n-propyl, or a pharmaceutically acceptable acid addition salt thereof.

2. A compound according to claim 1 wherein $R_1$ is cinnamyl.
3. A compound according to claim 1 wherein $R_1$ is 2-phenoxyethyl.

References Cited

UNITED STATES PATENTS

| | | | |
|---|---|---|---|
| 2,850,500 | 9/1958 | Elpern | 260—294.3 |
| 2,880,211 | 3/1959 | Elpern | 260—294.3 |
| 2,904,550 | 9/1959 | Pohland | 260—294.3 |
| 3,043,844 | 7/1962 | Elpern | 260—294.7 |
| 3,096,335 | 7/1963 | Elpern | 260—293.4 |
| 3,290,317 | 12/1966 | Carabateas | 260—293.4 |
| 3,408,357 | 10/1968 | Kühnis et al. | 260—294.3 |
| 3,081,309 | 3/1963 | Prost | 260—293.4 |
| 3,338,910 | 8/1967 | Kühnis et al. | 260—294.3 |

FOREIGN PATENTS

| | | | |
|---|---|---|---|
| 585,898 | 10/1959 | Canada | 260—294.3 |

OTHER REFERENCES

Braenden et al., Bulletin World Health Organization 13, 956–63 (1955).
Janssen et al., J. Med. Chem. 2 (1), 31–45 (1960).

HENRY R. JILES, Primary Examiner

G. T. TODD, Assistant Examiner

U.S. Cl. X.R.

260—2293.4, 294, 294.3, 294.7; 424—267